(No Model.)
G. C. RICHARDS.
TIRE TIGHTENER.
No. 438,362. Patented Oct. 14, 1890.
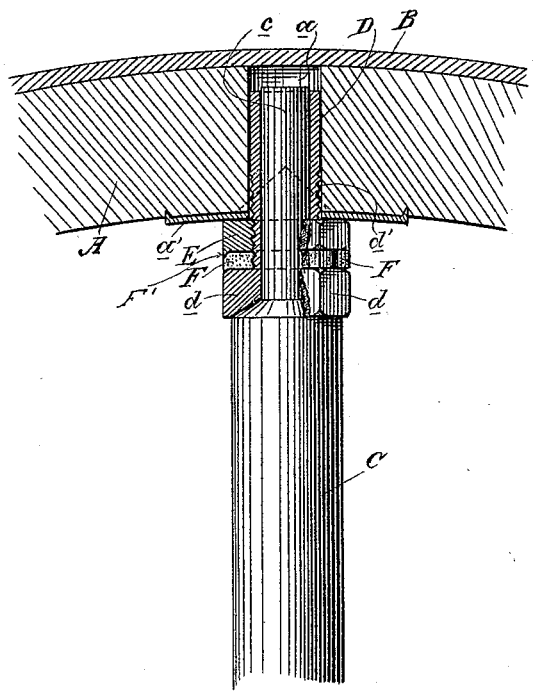
Witnesses,
Geo. H. Strong
Inventor,
George C. Richards
By Dewey & Co.
Atty's

UNITED STATES PATENT OFFICE.

GEORGE C. RICHARDS, OF SISSONS, CALIFORNIA, ASSIGNOR OF ONE-HALF TO WILLIAM T. TUCKWELL, OF SAME PLACE.

TIRE-TIGHTENER.

SPECIFICATION forming part of Letters Patent No. 438,362, dated October 14, 1890.

Application filed March 4, 1890. Serial No. 342,610. (No model.)

*To all whom it may concern:*

Be it known that I, GEORGE C. RICHARDS, a citizen of the United States, residing at Sissons, Siskiyou county, State of California, have invented an Improvement in Spoke and Tire Tighteners; and I hereby declare the following to be a full, clear, and exact description of the same.

My invention relates to that class of adjustable spoke-sockets in which the spoke is adjustably connected with the felly, said adjustment being controlled and operated by a nut, the effect of which is to vary the length of the spoke, thereby tightening the tire, the felly, and the spoke.

My invention consists in the novel combination and arrangement of parts, hereinafter fully described, and specifically pointed out in the claim.

The object of my invention is to provide a simple, effective, and practical device of this class.

Referring to the accompanying drawings for a more complete explanation of my invention, the figure is a section of my device.

A is the felly, and B is the tire of a wheel. In the felly is made the socket $a$, and around the entrance to this socket is the protecting-plate $a'$, fitted and secured suitably to the felly.

C is the spoke having the tenon $c$.

D is a metallic sleeve provided with a head $d$, and having external screw-threads $d'$ extending from the head throughout a portion of the length of said sleeve.

E is the adjusting-nut seated on the threaded sleeve, which is threaded double the thickness of the nut to permit the opening and tightening the joint of any two sections of the felly.

F is a split washer, adapted to be fitted upon sleeve D between its head $d$ and the adjusting-nut E and to be confined therein between a flange F' on the lower outer surface of the nut and a slightly-convex surface on the top of the base of the metallic sleeve. These several parts are fitted together as follows: The outer end of the sleeve D is inserted freely in the socket $a$ of the felly. The spoke-tenon $c$ is inserted in and passed through the sleeve, fitting its convex base or shoulder tightly against the concave head $d$ of the sleeve to prevent spreading and crushing the shoulders, and in all cases of the shrinkage of the spoke the sleeve may be perfectly tightened by a light pressure exerted by tightening the nut E. The adjusting-nut is run back on the sleeve so as to rest against the head $d$, and thus the sleeve penetrates the socket, in the first instance, to its farthest limit, so that the nut lies between the head $d$ and the protecting-plate $a'$. Now when adjustment is needed to tighten the parts the nut is turned so as to move farther out away from the head $d$, and as it bears against the plate $a'$ all the time and works on the threaded sleeve it forces the sleeve back out of socket $a$, or what is the same thing presses the felly outwardly on the sleeve, having the effect of lengthening the spoke, and thereby producing the necessary tightening. Then in the space between the head $d$ and the nut the washer F is fitted to fill up and to hold the nut. In this construction the parts are all out of the way and do not present the bad appearance of those devices which embrace the felly and only partly receive the spoke-tenon, which in my case is made long and enters the felly through the sleeve, which is itself seated in the felly.

In order to make the joint between the spoke or tenon shoulder and the head $d$ of the sleeve as perfect and complete as possible, I prefer to concave the head and convex the shoulder, as shown.

Having thus described my invention, what I claim as new, and desire to secure by Letters Patent, is—

In combination with a felly having a socket and a spoke having a tenon fitting said socket, a protecting-plate fitting around the spoke-socket and extending up along each side of the felly to prevent the splitting of the same, a sleeve upon the spoke-tenon, having a head provided with a concave seat adapted to receive a convex portion at the base of the tenon, a nut upon the threaded portion of the sleeve, having a flange F on its under surface, and a split washer between the nut and head of the sleeve, said washer being held in position by the flange and a curved surface on the upper and outer surface of the head, substantially as herein described.

In witness whereof I have hereunto set my hand.

GEORGE C. RICHARDS.

Witnesses:
CHAS. LEBER,
E. F. BUSS.